April 20, 1943.
A. HEHR
2,317,052
DRAWING INSTRUMENT
Filed April 5, 1941
3 Sheets-Sheet 1
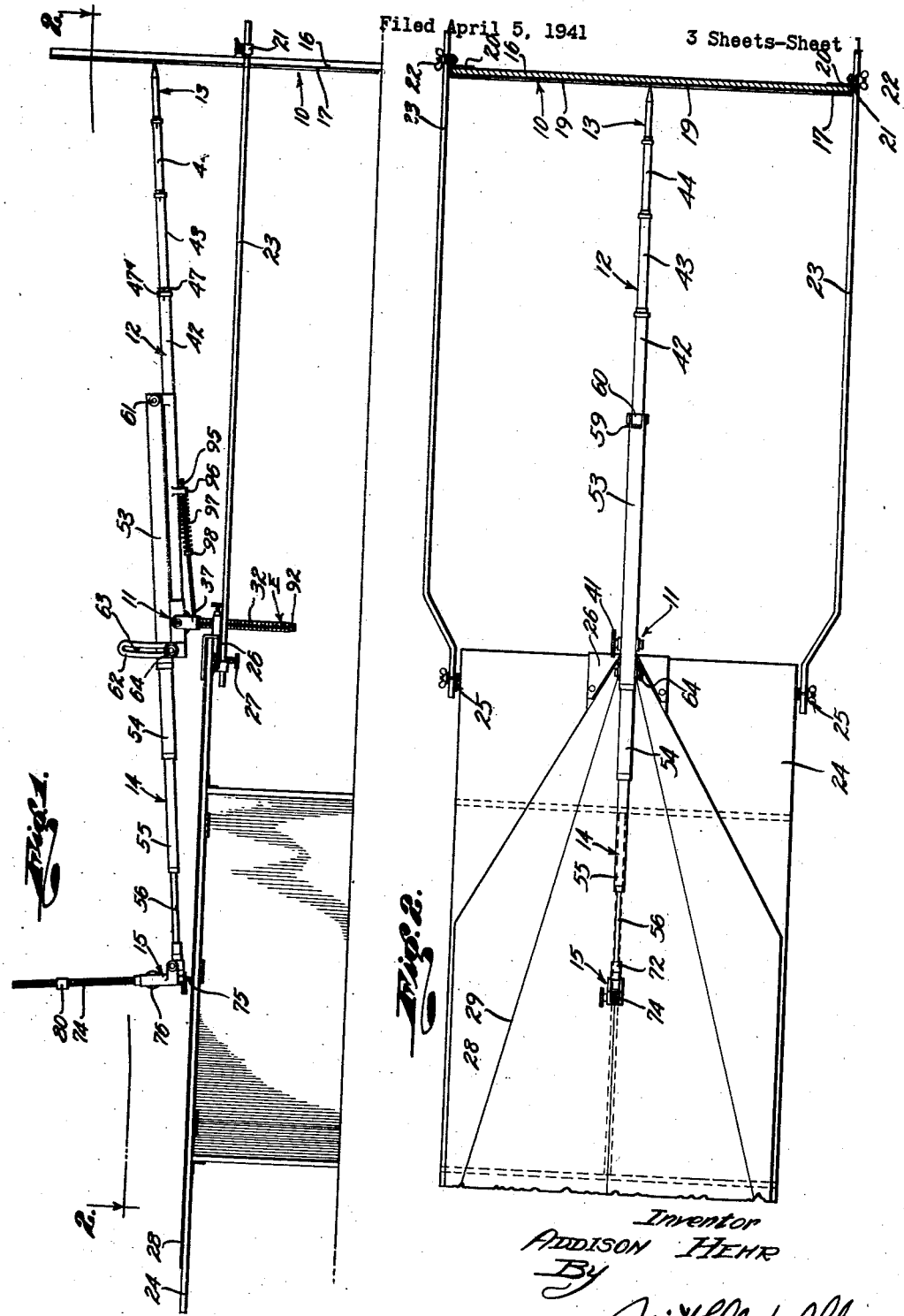
Inventor
ADDISON HEHR
By
His Attorney April 20, 1943.   A. HEHR   2,317,052
DRAWING INSTRUMENT
Filed April 5, 1941   3 Sheets-Sheet 2
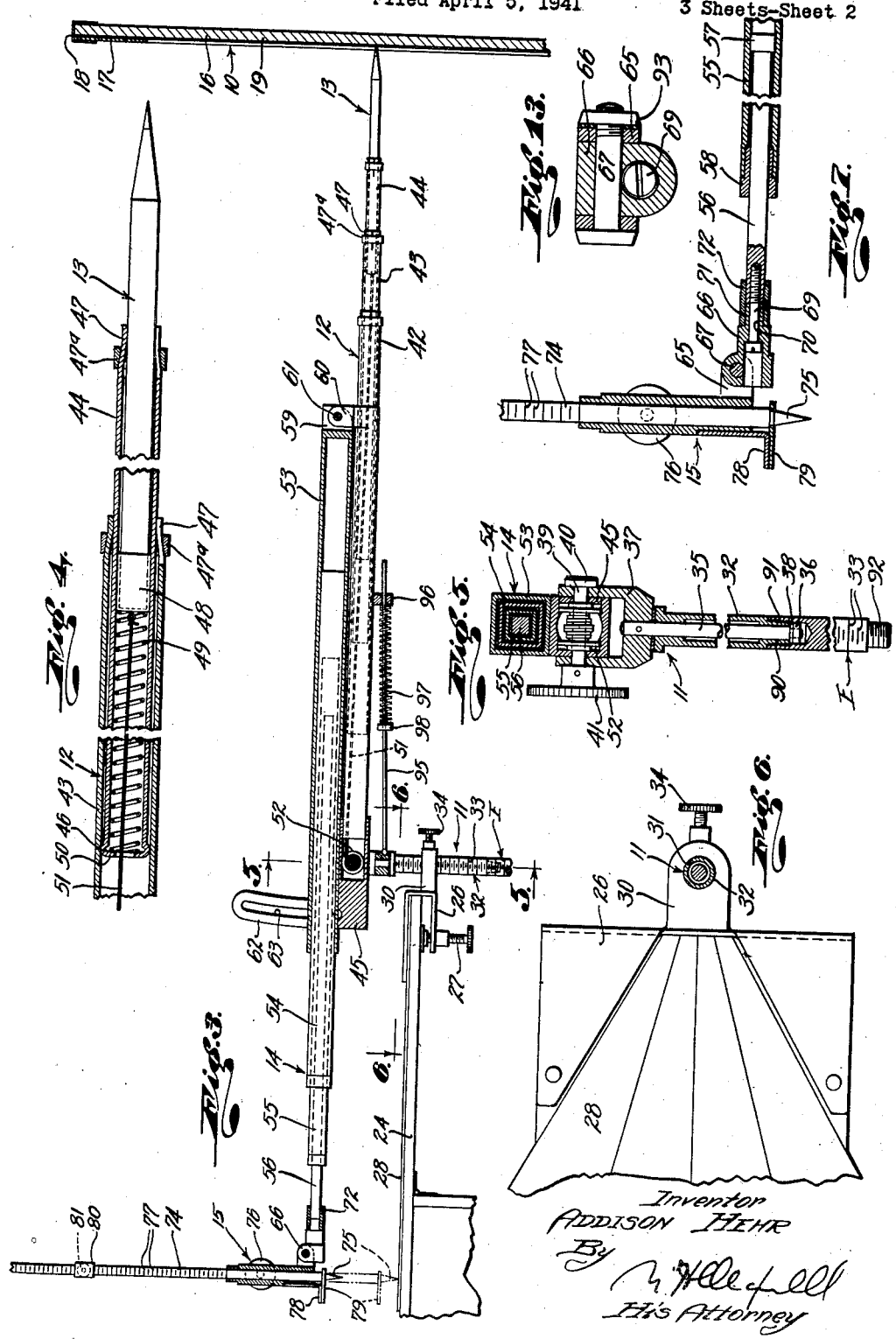
Inventor
ADDISON HEHR
By
His Attorney April 20, 1943.  A. HEHR  2,317,052
DRAWING INSTRUMENT
Filed April 5, 1941  3 Sheets-Sheet 3
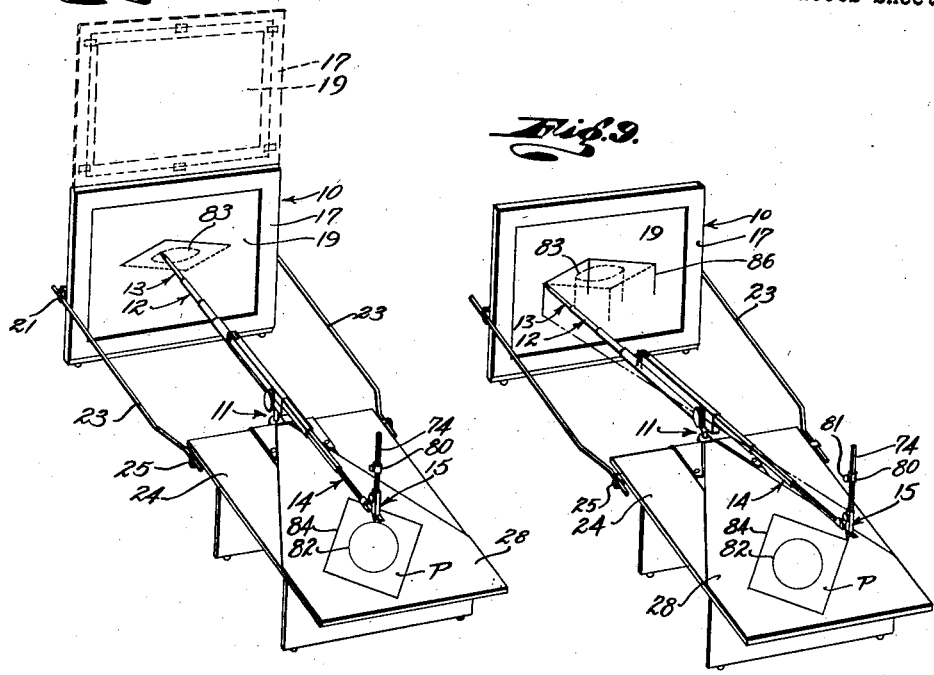
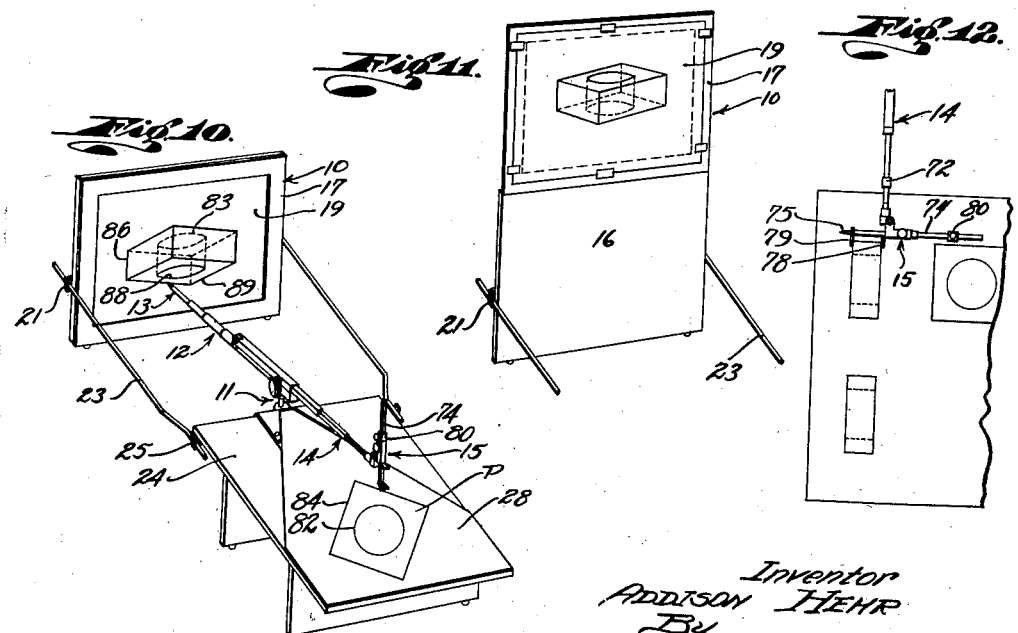
Inventor
ADDISON HEHR
By
[signature]
His Attorney Patented Apr. 20, 1943

2,317,052

UNITED STATES PATENT OFFICE 2,317,052

DRAWING INSTRUMENT

Addison Hehr, West Los Angeles, Calif.

Application April 5, 1941, Serial No. 387,001

12 Claims. (Cl. 33—18)

This invention relates to a drafting or drawing instrument and relates more particularly to an instrument useful in producing perspective views from plan views and vice versa. A general object of this invention is to provide a practical, effective and conveniently operated instrument of the character referred to suitable for use by mechanical draftsmen, architectural draftsmen, topographers, artists and many others.

Another object of this invention is to provide a drawing instrument by means of which a true perspective view may be easily and quickly produced from a plan view, topographical map, or the like. The instrument of the present invention is readily operable without special training or manipulation to quickly draw or produce a true and faithful perspective of the subject plan view.

Another object of this invention is to provide a simple, easily operated instrument which may be employed when occasion arises to draw or produce a plan view from a subject perspective view.

Another object of this invention is to provide a drawing machine or device of the character referred to that is readily adjusted to produce or draw the perspective or plan, as the case may be, in any selected scale with relation to the subject drawing or map, that is, the instrument may be quickly adjusted to draw the perspective or plan as the case may be, in a selected, enlarged or reduced scale with relation to the subject drawing or map or in the same scale as the original or subject drawing or map.

Another object of this invention is to provide a drawing device of the character mentioned that may be employed to draw perspective views from selected or required points of vision.

Another object of this invention is to provide a drawing device of the character mentioned embodying an adjustable and shiftable easel carrying a hinged matte for tracing paper or other material on which the drawing is to be made, the easel being shiftable and adjustable to provide for the production of drawings in different scales and at different perspective angles.

Another object of this invention is to provide a drawing instrument of the character referred to embodying a simple effective and convenient means for directly measuring the vertical elements or components of the subject plan view, which means is associated with the vertically shiftable head employed in the formation of the vertical lines of the perspective view.

A further object of this invention is to provide an instrument of the character referred to that is readily portable and quickly installed and that is capable of considerable modification to adapt it for various uses.

The various objects and features of my invention will be fully understood from the following detailed description of a typical preferred form and application of my invention, throughout which description reference is made to the accompanying drawings, in which:

Fig. 1 is a side elevation of a typical form of the invention in the operative position for the drawing of a perspective view from a subject plan view. Fig. 2 is a plan view of the instrument shown in Fig. 1, being a view taken substantially as indicated by line 2—2 on Fig. 1. Fig. 3 is an enlarged central vertical detailed sectional view of the instrument with certain parts appearing in side elevation and with broken lines illustrating the operative position of the tracing point. Fig. 4 is an enlarged fragmentary vertical detailed sectional view of the scribing arm with the pencil appearing in side elevation. Fig. 5 is an enlarged transverse detailed sectional view taken as indicated by line 5—5 on Fig. 3. Fig. 6 is an enlarged fragmentary horizontal detailed sectional view taken as indicated by line 6—6 on Fig. 3. Fig. 7 is an enlarged fragmentary vertical detailed sectional view of the tracing head portion of the instrument. Fig. 8 is a reduced diagrammatic perspective view illustrating the manner in which the instrument is employed in forming one end of a perspective figure. Fig. 9 is a view similar to Fig. 8 illustrating the manner in which the vertical components of the perspective figure are formed. Fig. 10 is a view similar to Fig. 8 illustrating the manner in which the other end of the perspective view is drawn. Fig. 11 is a fragmentary perspective view of the easel showing the matte raised. Fig. 12 is a fragmentary plan view of a portion of the apparatus illustrating the manner in which dimensions may be directly taken from a drawing or map for the formation of the vertical components of the perspective and Fig. 13 is an enlarged transverse detailed sectional view illustrating the pivotal connection between the tracing head and the tracing arm.

The drafting or drawing device of the present invention has a wide range of use, being adapted to draw perspective views of mechanical parts from mechanical plan views, being adapted to draw architectural interiors from architectural plan views, being adapted to draw landscapes from scaled topographical maps, being adapted to draw perspective views of displays, stages, motion picture sets, etc. from plans of the same and being capable of drawing perspective views from plans and maps of other kinds. Furthermore, the instrument is operable to form or draw plan views from subject perspective views and pictures of practically all kinds. The device or instrument is capable of extensive modification to adapt it for its different applications. In the following detailed description I will describe one typical form of the invention as employed in drawing a perspective view from a subject plan view of a simple mechanical or geometric figure, it being understood that the invention is not to be construed as limited or restricted to the specific form or application herein described.

The instrument of the present invention may be said to comprise, generally, an easel 10, universal mounting means 11, an extensible and contractible pointer arm or scribing arm 12 carried by the universal mounting means 11, a scriber or pencil 13 carried by the arm 12, an extensible and contractible tracing arm 14 carried by the universal mounting means 11 and a tracing head 15 on the arm 14.

The easel 10 is employed to mount the paper or the like on which the perspective drawing is to be made. The easel 10 is not always an essential element of the invention, for example, where other easel means or paper supporting means is present or where a wall, or the like, may be employed to support the paper the easel may be eliminated. Where the easel is employed it preferably comprises a flat backing board 16 of suitable material and a frame-like matte 17. The matte 17 is connected with the upper edge of the backing board 16 by hinges 18 so that it may be swung between a lowered position where it rests against the face of the board 16 and a raised position where it is above the backing board 16, the latter position being shown in full lines in Fig. 11 and in broken lines in Fig. 8. Tracing paper 19, or the like, is suitably secured to the face of the matte 17 to lie flat against the forward surface of the board 16 when the matte is in its lowered active position. If desired, the easel may be proportioned and arranged to have its lower edge rest on the floor, a table, or other support as illustrated in Figs. 1 and 2.

Means is provided for adjustably and shiftably supporting the easel 10. This means may comprise angle irons 20, or the equivalent, attached to the opposite end portions of the board 16 and tubular clamps 21 connected with the angle irons 20 by bolts or wing nuts 22, see Fig. 2. Generally horizontal arms or rods 23 are received in the clamps 21 and extend from the easel to the drawing or tracing board or table 24. The major portions of the rods 23 are straight and parallel and the outer portions of the rods are turned in to have parts lie adjacent opposite edges of the table 24. Brackets or clamps 25 at the opposite edges of the table 24 receive and hold the rods 23. The clamps 25 are such that they allow pivotal or swinging movement of the rods 23 and are such that they may be tightened to secure the rods against such movement in the selected or required position. When the clamps 21 at the easel 10 are loosened the easel may be shifted back and forth on the rods 23 toward and away from the table 24 to accommodate different adjustments of the scribing arm 12 for different scales of drawing as will later become apparent. The clamps 21 are such that the easel 10 may be tipped or tilted to selected angles with respect to the vertical for the production of various perspective effects. When the easel 10 is brought to the desired position and angle the wing nuts 22 are tightened to secure the easel against movement. The matte 17 which carries the paper 19 is freely received between the easel carrying rods 23 and may be swung between its raised and lowered position without interfering with the rods.

The universal mounting means 11 serves to mount or support the scribing arm 12 and the tracing arm 14 and constitutes the "point of vision" or "camera lens" element of the instrument. The mounting means 11 includes a clamp 26 or other suitable structure for attachment to the table 24. In the drawings I have shown a C-clamp 26 having upper and lower jaws for arrangement at the upper and lower sides of the table top. A clamp screw 27 is provided on the lower jaw of the clamp 26 for engaging the under side of the table top to secure the clamp to the table 24. The upper jaw of the clamp 26 may carry a drawing or tracing plate 28. The plate 28 is adapted to lie flat against the top surface of the table 24 and its side edges may radiate from the vertical center of the mounting means 11. Further, the plate 28 may have lines 29 radiating from said center to indicate the "angle of view" or "camera angle" for motion picture work, and the like, where such angles are of importance. The plate 28 is preferably formed of transparent material and presents a flat smooth upper surface. As best illustrated in Fig. 2 of the drawings, the plate 28 may be of substantial length and its side edges and outer end edge may substantially parallel the corresponding edges of the table 24.

The clamp 26 of the mounting means 11 has a boss or flange 30 projecting horizontally toward the easel 10 and the flange 30 has a vertical opening 31. A tubular post 32 shiftably passes through the opening 31 to project above and below the flange 30. Longitudinally spaced calibrations 33 are provided on the post 32 and may be read with the upper surface of the flange 30 or other appropriate fixed part to determine or establish the height of the "horizon" above the tracing or drawing surfaces of the table 24 as will later become apparent. A set screw 34 is provided on the flange 30 to releasably secure the post 32 in the selected adjusted positions. A shaft or stem 35 turnably passes through the post 32 and projects from the upper and lower ends of the post, see Fig. 5. A nut 36 is threaded on the lower end of the stem 35 and a slotted block or yoke 37 is pinned or otherwise fixed to the upper end of the stem. Washers or bearings 38 are arranged between the ends of the post 32 and the opposing faces of the nut 36 and yoke 37 to insure freedom of turning of the stem 35 and yoke 37.

In practice it may be found desirable to provide means for lengthening or extending the post 32 so that the perspective views may be drawn as though taken from high points of observation. In the particular case illustrated there is a single extension E for the post 32, it being understood that more extensions may be provided if required. The lower portion of the post 32 is reduced in diameter and threaded to form a pin 90. The extension E is an elongate member of the same diameter as the post 32 and is provided at its upper end with a screw threaded socket 91 for receiving the pin 90. The socket 91 is sufficiently deep to freely receive the nut 36. The lower end of the extension E may be provided with a pin 92 similar to the pin 90 to permit the attachment of a second extension. The extension E is provided with a scale or calibration 33 in the same manner as the post 32.

The mounting means further includes a horizontal pivot shaft 39 in the yoke 37. The shaft 39 is rotatably supported in horizontal openings in the side arms of the yoke 37. A head 40 is formed on one end of the shaft 39 to engage against one side of the yoke 37 and a knob 41 is pinned or otherwise fixed to the other end of the shaft to engage with the other side of the yoke. The purpose of the knob 41 will be later described. The universal mounting means 11 just described is a vertically adjustable universal support providing for movement of the arms 12 and 14 about the vertical axis of the stem 35 and about the horizontal axis of the shaft 39 and the post 32 and the parts carried thereby are vertically adjustable in the clamp flange 30.

The scribing arm 12 serves to carry the scriber or pencil 13. The arm 12 is an elongate member or structure extending forwardly from the yoke 37 toward the easel 10. In some simple forms of the invention the arm 12 may be rigid or at least non-expansible and non-contractible. In the form of the invention illustrated, however, the arm 12 is constructed for elongation and contraction for the purpose of varying the scale of the perspective drawing. In this case, the arm 12 is preferably a telescopic structure or assembly. As illustrated, the arm 12 comprises a multiplicity of nesting or telescopically engaged tubular sections 42, 43 and 44. The sections 42, 43 and 44 are graduated in cross sectional dimensions in the order named, the section 42 being the largest in transverse cross section and the section 44 being the smallest in cross section. The inner section 42 of the scribing arm 12 has its inner portion pivotally supported in the yoke 37. In practice the section 42 may have a socketed extension 45 received in the yoke 37 and the shaft 39 passes through openings in the side walls of the extension 45 to pivotally mount the scribing arm 12. The extension 45 may be polygonal or flat sided to engage in the yoke 37 as best shown in Fig. 5. Suitable means is provided for limiting outward movement of the sections 43 and 44. In the particular embodiment illustrated these means comprise enlargements or ridges 46 formed on the inner ends of the sections 43 and 44 and reduced slotted portions 47 on outer ends of the sections 42, 43 and 44. This structure is best shown in Fig. 4. The ridges 46 are engageable with the restricted portions 47 to prevent disconnection of the sections 43 and 44. Sliding sleeves 47ª are arranged on the portions 47 and the portions 47 are tapered. The sleeves 47ª may be shifted along the tapered slotted portions 47 to contact or allow expansion of the same for the purpose of adjusting the resistance to movement of the sections.

The pencil 13 is provided on the outer end of the scribing arm 12 to produce lines or marks on the paper 19. While I herein refer to the scribing element as the pencil 13, it is to be understood that the instrument may employ any suitable or required form of marking device. The pencil 13 is arranged for longitudinal movement in the outer section 44 of the arm 12 to be moved between the active position where it cooperates with the paper 19 and a retracted position clear of the paper. The pencil 13 extends inwardly through the end of the section 44 and is seated in, what I will term, a carrier 48 slidably engaged in the section 44, see Fig. 4. In practice the pencil 13 may be removably force fitted in the carrier 48 for ready insertion and removal by the user. A compression spring 49 is arranged within the section 44 and engages between the carrier 48 and an inturned flange 50 provided on the inner end of the section 44. The spring 49 serves to urge the pencil 13 outwardly so that its point or lead acts on the paper 19 and when the instrument is in use the spring holds the pencil in active drawing engagement with the paper. The outward movement of the carrier 48 may be stopped by the portion 47 of the section 44 when the portion 47 is adjusted to perform this action. The sleeves 47ª may be set or adjusted so that the reaction of the spring 49 does not produce unwanted movement of the sections 44 and 43.

Means is provided for manually controlling or retracting the pencil 13. This means may be varied considerably without departing from the invention. In the typical case illustrated the pencil control means comprises a flexible element 51 in the form of a cord or cable attached to the carrier 48. The flexible element 51 extends from the carrier 48 through the tubular arm 12 to the interior of the socketed extension 45. A winch or spool 52 is formed on the horizontal pivot shaft 39 of the universal mounting means 11 to be within the arm extension 45. The flexible element 51 is fixed to the spool 52 or is wound on the spool to be reeled up by rotation of the knob 41. The operator may rotate the knob 41 to retract the pencil 13 from the paper 19 and upon releasing the knob the spring 49 automatically returns the pencil 13 so that its point reengages the paper.

The tracing arm 14 is supported by the universal mounting means 11 through other elements to extend longitudinally over the tracing surface or table 24. In some embodiments of the invention the tracing arm 14 may be rigid with the scribing arm 12. In the form of construction illustrated, the tracing arm 14 is pivotally associated with the arm 12 so that it may be swung about a horizontal axis offset from the vertical axis of the means 11 whereby the instrument may be employed to draw elements which appear below the horizon or floor of the perspective view being produced on the paper 19. In accordance with the invention the tracing arm 14 is freely extensible and contractible and in the construction shown in the drawings, comprises a multiplicity of telescopically engaged sections 53, 54, 55 and 56. It is preferred to prevent relative turning of the telescopically engaged sections 53, 54, 55 and 56 by key means, noncircular engagement or flat surface engagement. In the particular construction illustrated, the sections 53, 54, 55 and 56 are polygonal or square in transverse cross section so that their mutual engagement holds them against relative turning. The sections of the arm 14 are graduated in cross sectional dimensions, the section 53 being the largest and the section 56 being the smallest. Means is provided for limiting the longitudinal movement of the sections 54, 55 and 56 to prevent disengagement of the parts. This means may comprise heads 57 on the inner ends of the sections engageable with nuts or bushings 58 secured in the outer ends of the surrounding sections, as illustrated in Fig. 7. The heads 57 and the bushings 58 may serve as bearing elements to assist in guiding and supporting the telescopically engaged sections one in the other. The small outermost section 56 may be solid or non-tubular. It is preferred to make the sections 53, 54, 55 and 56 of substantial length to give the instrument a large range of operation.

The means for associating the tracing arm 14 with the scribing arm 12 may comprise a tongue 59 on the closed end of the section 53 engaging in a yoke 60 on the outer portion of the scribing arm section 42. A pivot pin 61 on the yoke 60 passes through a horizontal opening in the tongue 59 to pivotally attach the arm 14 to the arm 12. The yoke 60 is spaced a substantial distance from the means 11 and with the arm 14 in its normal operating position the major portion of the tracing arm section 53 overlies and extends parallel with the section 42 as illustrated throughout the drawings. Releasable holding or securing means is provided for normally holding the tracing arm 14 against pivotal movement with respect to the arm 12. This means may comprise an upstanding part 62 on the extension 45 provided with an elongate slot 63 which is curved in concentric relation to the axis of the pin 61. A stud or screw on the section 53 passes through the slot 63 and a nut or knob 64 is threaded on the screw to clamp against the part 62 for the purpose of securing or locking the tracing arm 14 in the selected angular position with relation to the arm 12.

The tracing head 15 is arranged at the outer end of the tracing arm 14 and cooperates with a tracing element for following or tracing the lines of the plan or map on the plate 28 or table 24. The head 15 is an elongate tubular member which is normally upright or substantially vertical. A lateral lug 65 is provided on the lower part of the head 15 and is pivotally connected with a block 66. A horizontal pin or screw 67 pivotally connects the lug 65 with the block 66. It is preferred to associate a spring washer 93 or similar friction means with the pin 67 to present play at the pivotal connection. The block 66 is turnably connected with the outer end of the tracing arm 14. In the particular construction illustrated, a screw 69 is threaded in an axial opening in the end of the section 56 and is turnably received in a longitudinal opening 70 in the block 66. The head of the screw 69 has shouldered engagement in the opening 70 to prevent displacement of the block 66. Means is provided for releasably holding the block 66 against turning relative to the section 56. The block 66 has a grooved, splined or polygonal stem 71 of the same cross section as the outer portion of the arm section 56. A correspondingly shaped sleeve 72 slidably or shiftably engages around the outer portion of the section 56 and is adapted to engage about the stem 71. When the sleeve 72 is in the position best shown in Figs. 3 and 7 of the drawings, it serves to prevent turning of the block 66 and the head 15 relative to the arm 14. When the sleeve 72 is slid back on the section 56 the head 15 may be swung down to a position against or parallel with the plate 28 or the drawing thereon. The above described pivotal connection 65—67—68 between the head 15 and the block 66 allows the head 15 and the parts thereon to be swung down against the arm 14 to make the instrument more compact for handling, storing, etc.

A tracing stem 74 slidably passes through the tubular head 15. The lower end of the stem 74 is provided with a tracing point 75 adapted to be run along the lines of the plan view or map. Assuming that the point 75 is engaged with a drawing or map on the table 24 or the plate 28 the head 15 may be moved vertically on the stem 74 to produce swinging movement of the scribing arm 12 and the tracing arm 14 in vertical planes. Means is provided for releasably holding the head 15 against movement along the stem 74. A set screw is threaded through a transverse opening in the head 15 and has a head or knob 76 which may be turned to clamp the screw against the stem 74 for the purpose of setting or securing the head 15. The stem 74 is provided with a vertical scale or series of calibrations 77 for indicating the vertical setting of the head 15 on the stem. The calibrations 77 may be read with the upper end of the head 15 or a suitable mark on the head. A slidable stop 80 is provided on the stem 74 and has a set screw 81 for securing it in selected positions. The stem 74 and the stem receiving opening of the head 15 are preferably polygonal.

The tracing head 15 and the tracing stem 74 are equipped with means for calibering or measuring the vertical elements of the plan view being traced to set the head 15 for operation in different horizontal planes and to assist in setting the stop 80 for the formation of the vertical lines of the perspective view. A measuring finger 78 is fixed to the lower end of the head 15 to project horizontally therefrom. A similar measuring finger 79 is provided on the stem 74 at the point 75. The fingers 78 and 79 are in engagement when the head 15 is in its normal position on the stem 74. When the sleeve 72 is retracted the head 15 and the stem 74 are turned down against the table 24 or the plan view thereon and the vertical lines of the plan may be measured by means of the fingers 78 and 79 as illustrated in Fig. 12. The knob 76 may be employed to set or secure the head 15 in the measured or adjusted position whereupon the head may be swung to the vertical position and secured in place by the sleeve 72.

It may be preferred to provide counterbalancing means for the scribing arm and tracing arm assembly 12—13 to facilitate the smooth easy manipulation of the instrument and to assist in holding the tracing point 75 against the drawing surface. The counterbalancing means may take different forms, for example, it may be associated with the universal mounting means 11 to exert a turning or pivoting force on the yoke block or extension 45. In the typical form of the invention illustrated the counterbalancing means comprises a rod 95 pivotally secured to the yoke 37 and extending forwardly under the arm 12. A lug 96 depends from the under side of the arm section 42 and the rod 95 shiftably passes through an opening in the lug. A spring 97 surrounds the rod 95 and is under compression between the lug 96 and a transverse pin 98 on the rod 95. The spring 97 exerts a forward or outward force on the lug 96 which tends to swing the arm 12 upwardly and the arm 14 downwardly. The spring 97 is such that it counterbalances the assembly 12—14 to the desired degree.

In the use or operation of the instrument the tracing paper 19 is suitably secured to the matte 17 and the easel 10 is adjusted or shifted to occupy a position the required distance from the vertical axis of the mounting means 11 and the arm 12 is lengthened or shortened so that its pencil 13 contacts the tracing paper 19. The length of the arm 12 is one of the factors which determines the scale in which the perspective drawing is to be produced. When the arm 12 is shortened the scale of the perspective is reduced and when the arm is lengthened the scale is increased. In actual practice the arm 12 may be adjusted to the required length and the easel 10 may be brought to a position where the paper 19 is correctly engaged by the pencil 13.

The plan P, see Figs. 8 to 12, inclusive, whether it be a mechanical drawing, an architectural drawing, topographical map, or the like, is placed on the top of the table 24 or is placed on the plate 28. The surface of the plan P thus located presents the datum plane from which the vertical distances are measured. The plan P is arranged at the desired angle with relation to the vertical axis of the means 11 and at the desired distance from said axis. In this connection the lines 29 may assist in the placement of the plan P. In placing or locating the plan P it must be remembered that the universal axis of the means 11 constitutes the "camera position" or "observation point" for the perspective drawing and that the distance of the plan P from the axis of the means 11 is an additional factor which determines the scale of the perspective drawing to be made on the paper 19. When the plan P is properly positioned it is suitably secured in place. The screw 34 may be backed off and the post 32 may be adjusted vertically with respect to the clamp 26. This adjustment establishes the height of the horizon above the drawing surface. When the above adjustments have been made the instrument is in condition for use.

In making a perspective view from the simple plan P illustrated in the drawings the tracing point 75 is carefully guided along the several lines of the plan P with the head 15 in the position illustrated in Figs. 1 and 8 and with the pencil 13 urged against the paper 19 by the spring 49. The circle 82 of the plan will be reproduced in true perspective on the paper 19 to be in the form of an ellipse 83. When the lines of the square 84 of the plan P are followed the square will appear foreshortened in the perspective. Fig. 8 of the drawings illustrates the manner in which the instrument is employed to trace the circle 82 and the square 84 in the production of one end of the perspective figure. If it is desired to draw a horizon line on the perspective figure the head 15 is shifted along the stem 74 until the reading on the scale 77 corresponds to the reading at the calibrations 33, whereupon the tracing point 75 may be run across the plan P on the drawing surface at any selected point to produce a horizon line on the perspective.

Following the drawing of one end of the perspective figure as described above, the vertical lines of the perspective are drawn in. Before drawing in the vertical lines of the perspective it may be desired to measure the vertical lines of the mechanical plane. This may be done as described above by means of the measuring fingers 78 and 79. Thus, as illustrated in Fig. 12 the sleeve 72 is retracted and the head 15 and the stem 74 are swung down against the drawing surface whereupon the fingers 78 and 79 are brought to the opposite ends of the subject vertical line. The stop 89 is then brought against the upper end of the head 15 and secured in place and the head 15 and the stem 74 are returned to their upright position and are retained therein by the sleeve 72. The tracing point 75 is then placed at a corner of the square 84 of the plan P and the head 15 is slid up on the stem 74 until it engages the stop 80. This results in the drawing of one of the corners 85 of the perspective view, see Fig. 9. The same procedure is followed for the formation of each corner of the perspective figure. In drawing the walls of the opening 82 in the perspective figure the tracing point 75 is arranged at points where lines radiating from the vertical axis of the means 11 and tangent to the circle 82 meet the circle and the head 15 is shifted vertically on the stem 74 as in the drawing of the corner lines 86. It is to be understood that it is not always necessary to employ the fingers 78 and 79 in the measurement of the vertical elements of the plan P and that it is not always necessary to employ the stop 80 to limit the vertical motion of the head 15 when drawing the vertical lines 86 of the perspective.

In drawing the upper surface of the perspective figure the tracing head 15 is slid up on the stem 74 and is secured in a position which corresponds to the height of the object being drawn. This setting of the head 15 is facilitated by the scale 77 and by the stop 80 which may be adjusted to the required position as above described. The head 15 is locked in place by turning the knob 76. The tracing point 75 is then run along the several lines 82 and 84 of the plan P. This operation is illustrated in Fig. 10 of the drawings and results in the drawing of an ellipse 88 and the foreshortened square 89 which constitute the top of the inverted perspective figure. During the several drawing operations above described, the pencil 13 is controlled so that it does not produce unwanted or unnecessary lines on the perspective drawing. For example, when the tracing point 75 is being shifted from the lines 84 of the plan P to the circle 82 the operator turns the knob 41 to retract the pencil 13 so that the pencil does not form an unwanted line upon the perspective. The pencil 13 is retracted in a similar manner when the head 15 is being adjusted and shifted to various positions for the formation of the different lines.

The above operations complete the drawing of the perspective view on the paper 19. It is to be understood that while I have illustrated the apparatus as employed in the drawing of a very simple figure that it is adapted for the drawing of practically any form of perspective from a subject mechanical plan, architectural plan, topographical map, or the like. When the perspective drawing has been completed the matte 17 is swung to the raised position as illustrated in Fig. 11. This brings the formerly inverted and reversed perspective drawing to its correct position for viewing. Where tracing paper is employed on the matte 17 as above described, the completed perspective is readily visible at the face of the raised easel.

If it is desired to produce a plan view from a subject perspective a suitable scribing element, such as a pencil, is arranged on the lower end of the stem 74 and the pencil 13 may be replaced by a tracing point. The tracing point thus arranged on the arm 12 is merely directed along the lines of the perspective drawing on the matte 17 and the pencil on the stem 74 produces the resultant plan on a paper suitably arranged on the table 24 or the plate 28.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A drawing instrument comprising a universal mounting means, a scribing arm extending in one direction from the mounting means, an extensible and contractible tracing arm extending in the other direction from the mounting means comprising telescopically engaged sections of polygonal transverse cross section related for relative longitudinal movement without relative turning movement, the arms being connected for movement on the mounting means, a normally generally vertical tracing stem terminating at its lower end in a tracing point, and a part on the tracing arm shiftable on the tracing stem so that the scribing and tracing arms are pivoted about a vertical axis at the mounting means when the tracing point is moved along the lines of a subject drawing, the non-rotative engagement of said sections assuring pivoting of the arms as a unit during said movement of the point.

2. A drawing instrument comprising a universal mounting means, a scribing arm extending in one direction from the mounting means, an extensible and contractible tracing arm extending in the other direction from the mounting means, the tracing arm comprising telescopically engaged sections related for relative longitudinal movement, the configuration of said sections preventing relative turning between the sections, the arms being connected for universal movement on the mounting means, means supporting the mounting means for vertical adjustment, a normally generally vertical tracing stem, and a head on the tracing arm shiftable on the stem whereby the arms may be moved in vertical planes and whereby the arms are pivoted about a vertical axis at the mounting means when the tracing stem is moved along a subject drawing, the non-relative turning engagement of said sections maintaining the tracing stem vertical during its said movement.

3. A drawing instrument comprising a scribing arm and an extensible and contractible tracing arm connected with their longitudinal axes substantially in a common plane, the tracing arm comprising telescopically engaged sections related for relative longitudinal movement, the configuration of said sections preventing relative turning between the sections, scribing means on the scribing arm, a tracing element carried by the tracing arm for relative vertical movement, the tracing element having a pointed lower end for following the lines of a subject drawing, means spaced between the scribing means and the element supporting the arms for movement about a vertical axis and a horizontal axis, and releasable means for securing the tracing arm against movement on the tracing element in selected positions, the non-relative turning engagement of said sections assuring bodily movement of the tracing arm and element as a unit when said end of the element is moved along the subject drawing.

4. A drawing instrument comprising a scribing arm and an extensible and contractible tracing arm connected with their longitudinal axes substantially in a common plane, a retractible scribing means on the scribing arm, means for retracting the scribing means, a tracing stem adapted to be moved over the lines being traced, a head supported on the tracing arm for pivotal movement about the longitudinal axis of the tracing arm and shiftable vertically on the stem, releasable means for holding the head against pivoted movement and means between the scribing means and the head supporting the arms for movement about a vertical axis and a horizontal axis.

5. A drawing instrument comprising a universal mounting means, a scribing arm extending in one direction from the mounting means, an extensible and contractible tracing arm extending in the other direction from the mounting means, the arms being connected for universal movement on the mounting means, scribing means on the scribing arm, a generally vertical tracing stem having a pointed lower end adapted to be moved along the lines of a plan, a head on the outer end of the tracing arm movable vertically on the stem to produce vertical pivoting of the arms, and means for preventing pivoting of the head about the longitudinal axis of the tracing arm.

6. A drawing instrument comprising a universal mounting means, a scribing arm extending in one direction from the mounting means, an extensible and contractible tracing arm extending in the other direction from the mounting means, the arms being connected for universal movement on the mounting means, scribing means on the scribing arm, a generally vertical tracing stem to be moved along the lines of a plan, a head shiftable vertically on the stem, means for connecting the head with the tracing arm for pivotal movement about the longitudinal axis of the arm, and releasable means for holding the head against pivotal movement relative to the tracing arm.

7. A drawing instrument comprising a fixed support, a vertically adjustable post on the support, a part carried by the post for turning about a vertical axis, an assembly supported on said part for pivotal movement about a horizontal axis and including a scribing arm and an extensible and contractible tracing arm, an upright tracing stem, a head mounted on the tracing arm for pivoting about the longitudinal axis of the tracing arm shiftable vertically on the stem, and measuring fingers on the head and the lower portion of the stem.

8. A drawing instrument comprising a fixed support, a vertically adjustable post on the support, a part carried by the post for turning about a vertical axis, a scribing arm carried by said part for pivotal movement about a horizontal axis, a tracing arm secured to the scribing arm to pivot about a horizontal axis spaced from the first named horizontal axis, a tracing stem, and a head on the outer end of the tracing arm shiftable vertically on the stem.

9. A drawing instrument comprising a fixed support, a vertically adjustable post on the support, a part carried by the post for turning about a vertical axis, a scribing arm carried by said part for pivotal movement about a horizontal axis, a tracing arm secured to the scribing arm to pivot about a horizontal axis spaced from the first named horizontal axis, releasable means for holding the tracing arm against pivoting on the last named axis, a tracing stem, and a head on the outer end tracing arm shiftable vertically on the stem.

10. A drawing instrument comprising a scribing arm and an extensible and contractible tracing arm connected with their longitudinal axes substantially in a common plane, a retractible spring held scriber on the outer end of the scribing arm, means for retracting the scriber including a line secured to the scriber, and a manually rotatable spool spaced rearwardly from the scriber for reeling in the line, an upright tracing stem to be moved along the lines of a subject drawing, and a head on the outer end of the tracing arm movable vertically on the stem to pivot the arms.

11. A drawing instrument comprising a universal mounting means, a scribing arm extending in one direction from the mounting means, an extensible and contractible tracing arm extending in the other direction from the mounting means, the arms being connected for movement in unison, a normally generally vertical tracing stem, a head secured to the outer end of the tracing arm for turning about the longitudinal axis of the arm and shiftable vertically on the stem to cause pivoting of the arms about a generally horizontal axis, and measuring fingers on the stem and head for measuring parts of a subject drawing when the head and stem are pivoted down against the drawing.

12. A drawing instrument comprising a universal mounting means, a scribing arm extending in one direction from the mounting means, an extensible and contractible tracing arm extending in the other direction from the mounting means, the arms being connected for movement in unison, a normally generally vertical tracing stem, a head secured to the outer end of the tracing arm for turning about the longitudinal axis of the arm and shiftable vertically on the stem to cause pivoting of the arms about a generally horizontal axis, releasable means for holding the head against turning on said longitudinal axis, and measuring fingers on the stem and head for measuring parts of a subject drawing when the head and stem are pivoted down against the drawing.

ADDISON HEHR.